United States Patent [19]
Murphy et al.

[11] Patent Number: 5,385,413
[45] Date of Patent: Jan. 31, 1995

[54] BEARING ASSEMBLY WITH AXIAL RETENTION

[75] Inventors: Richard F. Murphy, Torrington; James Van Horne, Morris; Walter R. Gist, Jr., Harwinton, all of Conn.

[73] Assignee: The Torrington Company, Torrington, Conn.

[21] Appl. No.: 164,240

[22] Filed: Dec. 9, 1993

[51] Int. Cl.⁶ .............................................. F16C 19/26
[52] U.S. Cl. ................................... 384/564; 384/584; 384/585; 384/905.1
[58] Field of Search ............... 384/564, 905, 569, 584, 384/585, 551

[56] References Cited

U.S. PATENT DOCUMENTS

| | | |
|---|---|---|
| 3,920,296 | 11/1975 | Eckhardt . |
| 4,512,673 | 4/1985 | Condon, Jr. et al. ............ 384/569 |
| 4,657,414 | 4/1987 | Stella ............................. 384/548 |
| 4,689,604 | 9/1989 | Hill et al. ....................... 384/569 |
| 4,887,918 | 12/1989 | Kawachi ........................ 384/569 |
| 4,998,346 | 3/1991 | Bebrens ....................... 29/898.061 |
| 5,329,891 | 7/1994 | Murphy et al. ............... 384/905.1 |

FOREIGN PATENT DOCUMENTS

0539849A1  5/1993  European Pat. Off. .

OTHER PUBLICATIONS

Drawing of single-walled bearing assembly made public on or before Mar. 26, 1982.

*Primary Examiner*—Lenard A. Footland
*Attorney, Agent, or Firm*—John C. Bigler

[57] ABSTRACT

A double-walled bearing cup has an inner cup portion and an outer cup portion fixed over the inner cup portion. Abutment portions of the bearing cup are engageable with a retaining washer, which is positioned within the bearing cup and adapted to be fixed over a shaft, to limit axial movement of the bearing cup relative to the shaft. Rolling members positioned within the bearing cup are engageable directly with the shaft such that the bearing cup may freely rotate with respect to the shaft. The bearing cup may have an open, closed, or tapered end to facilitate use of the bearing assembly in various applications.

10 Claims, 1 Drawing Sheet

BEARING ASSEMBLY WITH AXIAL RETENTION

BACKGROUND OF THE INVENTION

This invention relates generally to bearing assemblies with rolling members and, more particularly, to a bearing assembly with rolling members that is axially retained on a shaft.

One application for such bearing assemblies is in piston pumps, as would be used, for example, in vehicle anti-lock brake systems (A.B.S.). According to one current practice, a machined outer race of a bearing assembly is held axially by two powder metal washers surrounding the bearing assembly and pressed on the shaft of the pump against opposite ends of the bearing assembly. This design requires a complicated bearing installation as well as undesirable cost and space requirements inherent with multiple powder metal washers.

According to another current practice, a bearing assembly includes an inner sleeve serving as an inner race and including a radially outwardly directed flange. The inner sleeve is pressed onto the shaft of the pump, and the flange of the inner sleeve is entrapped by a double-walled outer sleeve of the bearing assembly to maintain axial location of the bearing assembly. This design eliminates the need for multiple powder metal washers but adds the cost and space requirements associated with the inner sleeve.

A bearing assembly with a single-walled drawn outer cup has been proposed with axial retention provided by a collar entrapped between the outer cup and a bearing retainer holding the rolling elements. However, in many applications, including A.B.S. pumps, for example, the single-walled drawn outer cup may not have sufficient strength for bearing operation. In addition, the collar may interfere with roller and bearing retainer movement and may damage the bearing retainer when the bearing assembly is pressed onto a shaft during installation of the bearing assembly.

The foregoing illustrates limitations known to exist in present devices and methods. Thus, it is apparent that it would be advantageous to provide an alternative bearing assembly with axial retention directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing assembly for mounting on a shaft, the bearing assembly comprising a double-walled bearing cup and retaining washer positioned within the bearing cup. The bearing cup is coaxial with the shaft and has an inner cup portion and an outer cup portion fixed over the inner cup portion. Abutment means provided by the bearing cup limits axial movement of the bearing cup relative to the retaining washer, which is adapted to be fixed over the shaft. Rolling members are positioned within the bearing cup and are engageable directly with the shaft such that the bearing cup may freely rotate with respect to the shaft.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
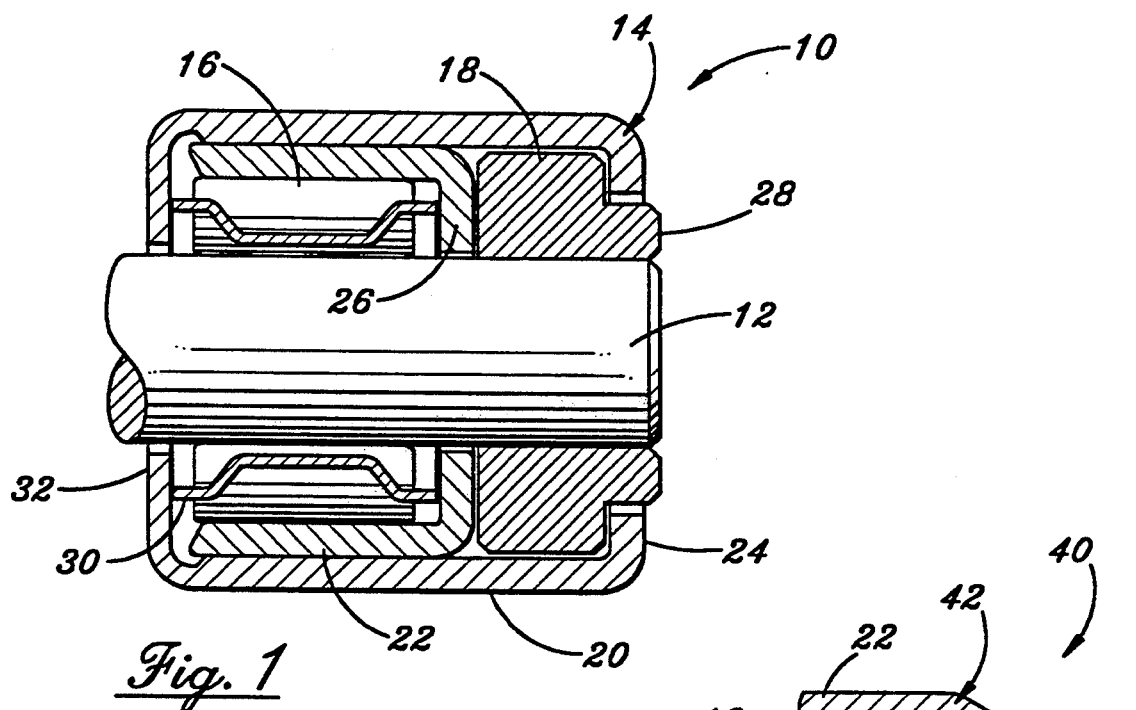
FIG. 1 is a cross-sectional view illustrating a first embodiment of the bearing assembly of the present invention.

Referring now to the drawings, FIG. 1 illustrates bearing assembly 10 of the present invention mounted on shaft 12, coaxially with respect to shaft 12, and comprising double-walled bearing cup 14, rolling members 16, and retaining washer 18.

Bearing cup 14 comprises outer cup portion 20 fixed over inner cup portion 22, by press-fit, staking or other means, both of which may be conveniently drawn of sheet metal. Cup portions 20 and 22 have cylindrical side walls and radially inwardly directed flanges 24 and 26, respectively, at a first end of bearing cup 14. During assembly, retaining washer 18 is positioned between and is partially enclosed by flanges 24 and 26 such that movement of retaining washer 18 is limited in one axial direction by abutment with flange 24 and in the other axial direction by abutment with flange 26.

Retaining washer 18 has a disc configuration providing sufficient clearance to bearing cup 14 to allow free rotation of bearing cup 14 relative to retaining washer 18. Optional annular lip 28 may be provided at one end of retaining washer 18 to close the annular space between shaft 12 and flange 26 or to ensure that the relative positions of elements of bearing assembly 10 are maintained when pressed onto shaft 12. Retaining washer 18 may be economically formed of powder metal and is fixed to shaft 12, either by press-fit or other means.

The inside surface of the cylindrical side wall of inner cup portion 22 provides an outer raceway for rolling members 16, which are positioned in the annulus between bearing cup 14 and shaft 12. Rolling members 16 ride directly on shaft 12, which serves as an inner raceway without an employing an inner sleeve, to provide free rotation of bearing cup 14 relative to shaft 12. A full complement of rolling members 16 may be used or bearing retainer 30 may be provided, as shown, to maintain the desired positions of rolling members 16 and to facilitate assembly of bearing assembly 10.

The second end of outer cup portion 20 is formed with curl 32 or other radially inwardly directed portion which at least partially closes the annulus between bearing cup 14 and shaft 12. Movement of rolling members 16 is limited in one axial direction by abutment of rolling members 16 or bearing retainer 30, if provided, with curl 32 or other radially inwardly directed portion. Movement in the other axial direction is limited by abutment with inner cup flange 26. The cylindrical side wall of outer cup portion 20 is thinned somewhat at the second end, as shown in FIG. 1, to facilitate forming of curl 32 by bending after assembling the elements of bearing cup 14.

Figure 2:
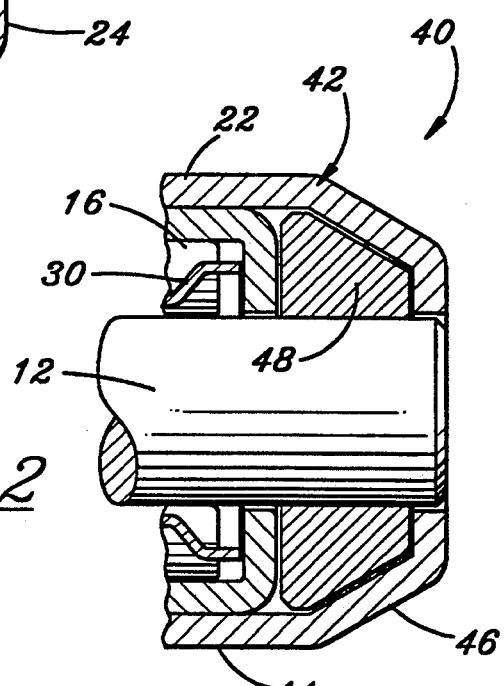
FIG. 2 is a partial cross-sectional view illustrating a second embodiment of the bearing assembly of the present invention.

FIG. 2 illustrates a second embodiment of the present invention, bearing assembly 40, having double-walled bearing cup 42 with modified outer cup portion 44.

Tapered portion 46 of outer cup portion 44 provides a cone-shaped wedge for spreading and guiding pistons of an A.B.S. pump or other elements during installation of bearing assembly 40. Retaining washer 48 is configured to conform to tapered portion 46 and is located axially by abutment with flange 50 of outer cup portion 44 or with tapered portion 46.

Figure 3:
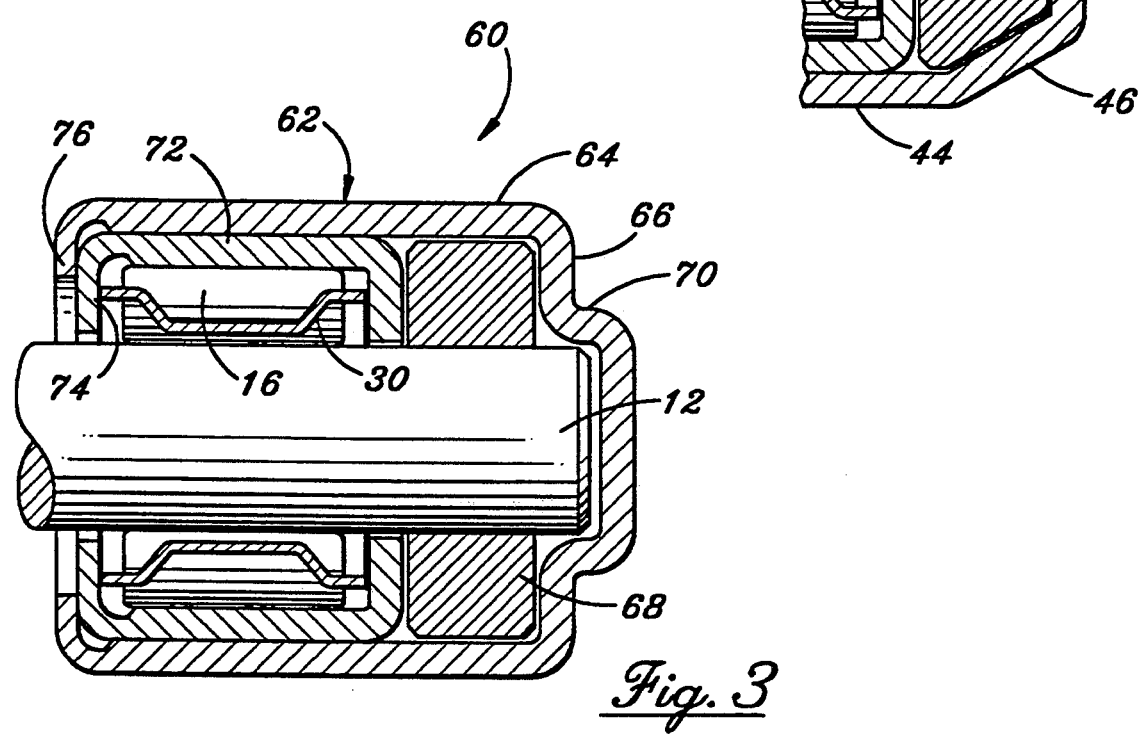
FIG. 3 is a cross-sectional view illustrating a third embodiment of the bearing assembly of the present invention.

A third embodiment of the present invention is illustrated in FIG. 3. Bearing assembly 60 has double-walled bearing cup 62 with a closed first end for mounting at an end of shaft 12. In place of flange 24 of outer cup portion 20 of FIG. 1, outer cup portion 64 has annular shoulder 66 for abutment with retaining washer 68. The closed end of bearing cup 62 may be substantially flat or may have step 70 providing clearance for shaft 12 to extend through retaining washer 68. As with outer cup portion 20, outer cup portion 64 may be conveniently drawn from sheet metal.

Inner cup portion 72 of bearing cup 62 is formed with curl 74, which provides an abutment surface to locate rolling members 16 axially. Because the principal function of curl 32 of outer cup portion 20 is provided by curl 74, the second end of outer cup portion 64 may be formed without a curl or may include curl 76, which extends radially inwardly only a short distance, abutting curl 74 to lock inner cup portion 72 in place but leaving a space between curl 76 and shaft 12. This embodiment adds strength to bearing cup 62 while simplifying the fabrication of outer cup portion 64.

From the above description, it will be apparent that the present invention provides an improved bearing assembly with axial retention which eliminates the expense and space requirements of both a second retaining washer and an inner sleeve. The outer cup of the bearing assembly is economically formed with a double wall providing sufficient strength for use in A.B.S. pumps and other applications currently employing a machined outer race. The retaining washer does not abut the bearing retainer and, consequently, does not interfere with roller or bearing retainer movement and does not damage to the bearing retainer during installation of the bearing assembly on a shaft.

Having described the invention, what is claimed is:

1. A bearing assembly for mounting on a shaft, the bearing assembly comprising:
    a double-walled bearing cup coaxial with the shaft, the bearing cup having an inner cup portion and an outer cup portion fixed over the inner cup portion;
    a retaining washer positioned within the bearing cup and adapted to be fixed over the shaft;
    abutment means provided by the bearing cup for limiting axial movement of the bearing cup relative to the retaining washer; and
    rolling members positioned within the bearing cup, engageable directly with the shaft, such that the bearing cup may freely rotate with respect to the shaft.

2. The bearing assembly according to claim 1, wherein the abutment means comprises a first stop surface of the outer cup portion limiting relative movement of the bearing cup with respect to the retaining washer in one axial direction and a second stop surface on the inner cup portion limiting relative movement of the bearing cup with respect to the retaining washer in the other axial direction.

3. The bearing assembly according to claim 1, wherein the outer cup portion includes a radially inwardly directed flange at a first end of the bearing cup and the inner cup portion includes a radially inwardly directed flange spaced axially from the outer cup flange, the retaining washer being positioned between the outer cup flange and the inner cup flange, the abutment means comprising the outer cup flange and the inner cup flange.

4. The bearing assembly according to claim 3, wherein the inner cup portion includes a cylindrical side wall extending axially from the inner cup flange toward a second end of the bearing cup, the cylindrical side wall providing an outer raceway for the rolling members.

5. The bearing assembly according to claim 1, wherein the bearing cup includes a first end at least partially enclosing the retaining washer and a second end at least partially enclosing the rolling members, the second end of the bearing cup having a radially inwardly directed portion limiting movement of the rolling members in one axial direction.

6. The bearing assembly according to claim 5, further comprising a bearing retainer holding the rolling members.

7. The bearing assembly according to claim 1, wherein the outer cup portion is tapered inwardly from a cylindrical side wall in a direction toward a first end of the bearing cup.

8. The bearing assembly according to claim 1, wherein the outer cup portion includes a closed first end.

9. The bearing assembly according to claim 8, wherein the closed first end of the outer cup portion includes an annular step engageable with the retaining washer such that the shaft may extend axially beyond the retaining washer without engaging the bearing cup.

10. The bearing assembly according to claim 1, wherein the retaining washer is an annular ring configured to provide a press-fit with the shaft.

* * * * *